US006430989B1

(12) United States Patent
Van Dyke et al.

(10) Patent No.: US 6,430,989 B1
(45) Date of Patent: Aug. 13, 2002

(54) METHOD AND APPARATUS FOR EVALUATING SWIMWEAR FOR UNDERWATER LEAKAGE

(75) Inventors: Sherry Ann Van Dyke, Neenah; Robin Kurt Nason; Daryl Steven Meyer, both of Oshkosh; David W. Koenig, Menasha; Thomas Mathias Kolb, Appleton; Cynthia Helen Nordness; Marcille Faye Ruman, both of Oshkosh; Faith Eileen Cochrane, Appleton; Jesse Paul Sorenson, Little Chute; Devertt DeWayne Woolwine, Neenah; Jerome James Workman, Jr., Appleton, all of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/751,907

(22) Filed: Dec. 29, 2000

(51) Int. Cl.[7] ............... G01M 03/26; G01M 03/06; C12Q 01/70; A61F 13/15
(52) U.S. Cl. ............ 073/45.5; 073/40; 604/385.101; 604/387
(58) Field of Search ........... 073/45.5, 40; 604/385.101, 604/385.24, 387

(56) References Cited

U.S. PATENT DOCUMENTS

| | | | | |
|---|---|---|---|---|
| 2,054,204 A | * | 9/1936 | McDonald ............... 73/51 |
| 4,704,115 A | * | 11/1987 | Buell ................ 604/385 A |
| 4,762,521 A | * | 8/1988 | Roessler et al. ........ 604/385 A |
| 4,799,384 A | * | 1/1989 | Casali ................. 73/45.5 |
| 4,850,990 A | * | 7/1989 | Huntoon et al. ......... 604/385.2 |
| 4,938,753 A | * | 7/1990 | Van Gompel et al. ... 604/385.2 |
| 5,207,663 A | * | 5/1993 | McQueen ............. 604/385.1 |
| 5,289,819 A | * | 3/1994 | Kröger et al. ......... 128/200.24 |
| 5,329,807 A | * | 7/1994 | Sugar et al. ............ 73/40 |
| 5,331,015 A | * | 7/1994 | DesMarais et al. ....... 521/62 |
| 5,390,531 A | * | 2/1995 | Taylor ............... 73/40 |
| 5,422,240 A | * | 6/1995 | Lytle et al. ............ 435/5 |
| 5,429,629 A | * | 7/1995 | Latimer et al. ......... 604/378 |
| 5,493,899 A | * | 2/1996 | Beck et al. ........... 73/40.7 |
| 5,624,425 A | * | 4/1997 | Gray et al. .......... 604/385.2 |
| 5,766,411 A | * | 6/1998 | Wilson ............... 156/495 |
| 5,814,037 A | * | 9/1998 | Coates .............. 604/393 |
| 6,258,076 B1 | * | 7/2001 | Glaug et al. .......... 604/387 |

* cited by examiner

Primary Examiner—Hezron Williams
Assistant Examiner—David J. Wiggins
(74) Attorney, Agent, or Firm—Pauley Petersen Kinne & Erickson

(57) ABSTRACT

A quantitative method of evaluating swimwear for underwater leakage using a mechanical test mannequin, a water tank, a fluorescent bowel movement simulant, and a fluorescence meter. More particularly, a swimwear garment is applied to the mannequin, the fluorescent bowel movement simulant is inserted into the swimwear garment, the mannequin and the swimwear garment are submersed into water within the water tank, and a motion mechanism attached to the mannequin moves the mannequin up and down, thereby simulating typical water play movements. The fluorescence meter can be used to quantitatively determine the amount of leakage of the fluorescent bowel movement simulant from the swimwear garment.

27 Claims, 6 Drawing Sheets

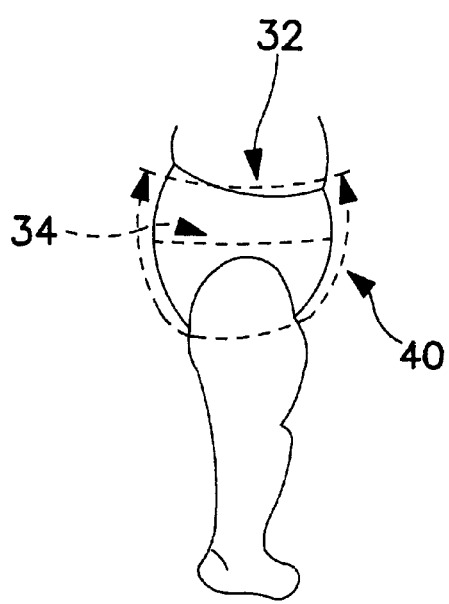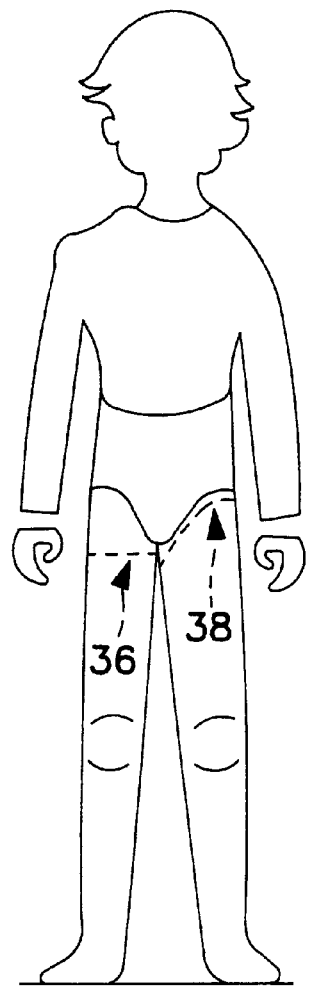
FIG. 5
FIG. 6

METHOD AND APPARATUS FOR EVALUATING SWIMWEAR FOR UNDERWATER LEAKAGE

FIELD OF THE INVENTION

This invention is directed to a bench test for evaluating underwater waste containment by garments.

BACKGROUND OF THE INVENTION

Swimwear for pre-toilet trained children is often designed to contain urine and bowel movements (BM) while the children are in a pool environment. Even though absorbent swimwear is designed to prevent leakage of urine and BM out of the garment and seepage of swim water into the garment, swim water inevitably tends to make its way into the garment. The swim water inside the garment mixes with the urine and BM inside the garment and may re-enter the swimming environment along with the urine and BM.

Quantifying the containment of BM by various swim garments has proven difficult with live subjects. BM incidence in children's disposable swimwear products is low, typically occurring in about 8% of all such swim garments worn. Quantifying the amount of fecal material leaked into a pool is virtually impossible. Contributing to the difficulty is the fact that live subjects introduce an endless number of variables due to activity level, physical size, shape, etc.

In the past, qualitative testing has been used as a primary source of BM containment performance information. Qualitative testing is subjective, non-reproducible, and can be highly susceptible to tester and researcher variability.

There is thus a need or desire for a quantitative and/or semiquantitative method of evaluating swimwear for underwater leakage that eliminates the potential for variability.

SUMMARY OF THE INVENTION

The present invention is directed to a quantitative and/or a semiquantitative bench test that can be used as a dependable method of evaluating swimwear for underwater leakage. More specifically, the bench test of the present invention can provide qualitative analysis, i.e., a visual assessment of where leakage is occurring by watching the test as it runs; semiquantitative analysis, i.e., a determination of whether one pant leaks more than another based on fluorescence data, such as higher fluorescence numbers indicating greater leakage; and/or quantitative analysis, i.e., a determination of the exact amount of simulant leakage from a given pant by use of a calibration curve.

This quantitative bench test eliminates the potential for variability and can be used to test disposable swim pants, plastic pool pants, and other garments used as swimwear. Apparatus used for carrying out the bench test includes simulated bowel movement (BM) and a mannequin to imitate a "fecal event" during water play.

The development of the bench test can involve motion studies to identify common swim motions performed during water play, along with the degree of rotation per second of the motion. In addition, anthropometric data can be compiled to determine average body measurements. A test mannequin, replicating only the mid-torso to mid-thigh portion of a child's body, can be produced using the anthropometric data and the flexibility requirements determined from the motion study.

A sophisticated water tank can be developed that provides enough water for the mannequin to be completely submerged and also covering a mechanical motion mechanism required to simulate the motions identified from the motion study; i.e., walking/running, swimming, jumping, stepping up and squatting. After the mannequin is properly attached to the motion mechanism, fluorescent BM simulant can be introduced into the back of a swim pant or other swimwear garment worn by the mannequin. Throughout the product testing, fluorescence measurements can be recorded to determine the amount of simulant released into the water tank over time.

In carrying out the method of the invention, the bench test repetitively reproduces the common motions performed by children in water play. Quantitative, qualitative and semi-quantitative measurements can be obtained using the fluorescent BM simulant and a fluorescence meter, such as a fluorescence spectrophotometer, to determine the amount of BM simulant that leaks from the swim pant, or other swimwear garment, into the pool water. Water samples can be taken and tested throughout the testing to determine the fluorescence intensity in the water, with the level of intensity indicating the concentration of the fluorescent dye and thereby indicating the amount of BM simulant leakage.

With the foregoing in mind, it is a feature and advantage of the invention to provide a dependable, quantitative or semi-quantitative method of evaluating swimwear for underwater leakage.

BRIEF DESCRIPTION OF THE DRAWINGS

FIG. 5 is a partial side view of a child showing appropriate areas for measurement;

FIG. 6 is a front view of a child showing appropriate areas for measurement;

DEFINITIONS

Within the context of this specifications each term or phrase below will include the following meaning or meanings.

"Attached to" refers to the joining, adhering, connecting, bonding, or the like, of two elements. Two elements will be considered to be attached to one another when they are attached directly to one another or indirectly to one another, such as when each is directly attached to intermediate elements.

"Bowel movement (BM) simulant" refers to a substance designed or intended to reproduce or closely simulate one or more properties of real bowel movements.

"Motion mechanism" refers to a device that enables movement of an object attached to the motion mechanism. For example, a motion mechanism can force an object to move up and down or side to side.

"Swimwear" includes swimsuits, swim pants, disposable swimwear, as well as durable, reusable swimwear. "Water play motions" refer to any type of physical movements performed by a person engaging in activities in an aqueous environment. Examples of common water play motions include walking, swimming, jumping, stepping up, and squatting.

These terms may be defined with additional language in the remaining portions of the specification.

DETAILED DESCRIPTION OF THE PRESENTLY PREFERRED EMBODIMENTS

The present invention is directed to a method of quantitatively, qualitatively, and/or semiquantitatively evaluating swimwear for underwater leakage. The principles of the present invention can be applied to disposable, pant-like, absorbent swimwear articles, such as swim pants and swimsuits, as well as durable swimwear or any other pant-like product worn in the water. For ease of explanation, the description hereafter will be in terms of a test for BM leakage from a swim pant 50.

Figure 1:
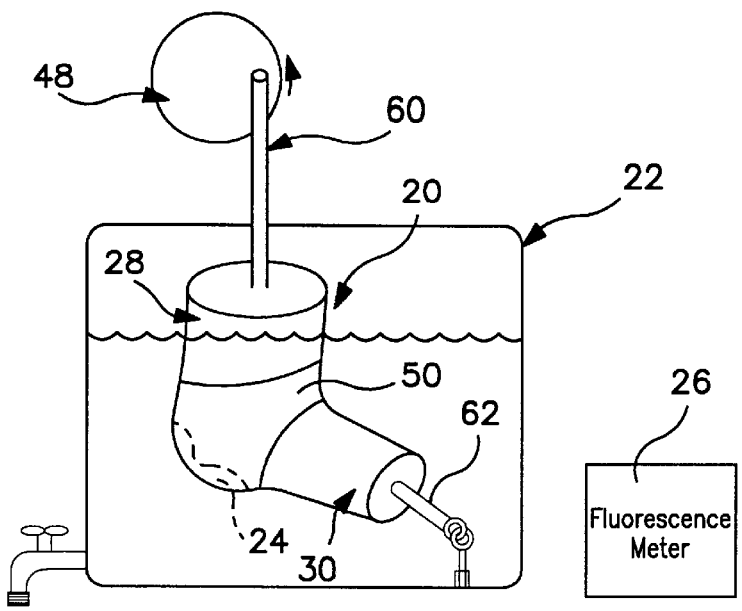
FIG. 1 is a side view of one type of apparatus used to carry out the method of the invention.

Apparatus for carrying out the method of the invention includes a mechanical test mannequin 20, a water tank 22, fluorescent bowel movement (BM) simulant 24 and a fluorescence meter 26, as shown in FIG. 1, each of which is described in greater detail below.

To eliminate the need to use actual BM, a BM simulant can be used. The BM simulant can be compared to actual BM to determine whether or not the solubility and dissipation are similar between the actual BM and the BM simulant. After finding a suitable BM simulant, a fluorescent dye can be added to the BM simulant to provide a way to detect the presence of BM leakage in the water. A variety of fluorescent additives may be used to provide fluorescence behavior for the simulant. The selection of the additive can provide a measure of leakage on the scale that is of greatest interest for the test at hand. If one wishes to measure leakage at the molecular scale, such as leakage of a liquid like urine, one may select an additive that is a fluorescent molecule and is soluble in water, such as the sodium salt of fluorescein, discussed below. If one wishes to measure leakage of particles the size of the smallest bacteria that occur in BM, one may select an additive that is a particle on the order of 0.2 to 0.25 microns in size, such as latex beads. If one wishes to measure leakage of particles larger than bacteria, such as particles of food remaining in BM or agglomerates of particles, one may select an additive that has particles up to one or more millimeters in size, such as latex beads. The use of a small, e.g. molecular scale or soluble, additive to model the escape of larger particles, such as bacteria in BM, may be considered a "worst case scenario" in modeling that type of leakage. In other words, modeling the escape of bacteria using a fluorescent molecule that is smaller than bacteria would provide leakage values that bacteria should never be able to exceed.

A particularly suitable BM simulant that can be used to carry out the method of the invention is a substance available from SiliClone Studio of Valley Forge, Pa., sold under the trade name FECLONE™. More specifically, a fluorescent version of BM simulant can be used, namely FECLONE™ Fluorescein-15-0.5×. FECLONE™ is available in a dry powder formulation that can be mixed with water. The composition of FECLONE™ includes fibrous cellulosic and hemicellulosic plant derivatives, lard, polyoxyethylene, xanthan gum and sodium salt of fluorescein. Fluorescein is a highly concentrated and soluble fluorescent dye that provides highly sensitive quantitative readings at concentrations appropriate for the method of the invention. Fluorescein is often used to trace underground water and municipal water treatment lines.

The size of the fluorescent dye in this type of FECLONE™ is characteristic of various types of bacteria. Some bacteria and parasites that can be present in BM include Vibrionaceae, Clostridaceae, Enterobacteriaceae, Pseudomonadaceae, Streptococcaceae, Legionellaceae, and Mycobacteriaceae. Other fecal contaminates can include Hepatitis A and polio viruses.

A fluorescence instrument, such as a fluorescence spectrophotometer, can be used to measure the level of fluorescent dye in the water tank when carrying out the method of the invention. The fluorescence spectrophotometer can provide quantifiable measurements of the concentration of fluorescent dye present in the water, thereby approximating the amount of bacterial leakage that would occur under the same conditions. An example of a suitable fluorescence spectrophotometer is an Hitachi Model F-2500 FL with a thermostatic single cell holder, manufactured by Hitachi Instruments, Inc. of Naperville, Ill., and available from Cole-Parmer Instruments Co., Vernon Hills, Ill. An alternative sampling system could employ a continuous flow fluorescence cuvet manufactured by Hitachi Instruments, Inc. of Naperville, Ill., for continuous-flow sampling. Coordinating FL Solutions software can be used with this particular spectrophotometer to provide quantitative, qualitative, and/or semiquantitative measurements of the intensity of fluorescent dye in the water tank.

Water samples can be manually drawn from the water tank after testing each product to determine the difference in fluorescent intensity. Alternatively, in using a spectrophotometer, a water sample can be drawn from the dissolution tank, circulated through the flow cell, and returned to the tank. Clean water is used to flush the system during change-over of experimental conditions.

To obtain an approximate value of the amount of fluorescent dye in the water tank, the instrument may be calibrated by analysis of samples of known concentration. A calibration curve can be produced by dispersing 90 cubic centimeters (cc) of BM simulant into the water tank, in increments of 10 cc. After each 10 cc increment is added to the tank, 5 minutes are allowed to elapse to allow for adequate dispersion of the particles. After each 10 cc insult, a water sample can be withdrawn to determine the fluorescence intensity. Each insult represents a calibration sample. A calibration curve can be created by plotting the fluorescence intensity of each calibration sample against the concentration of simulant in the tank when the sample was collected. For quantitative analysis, fluorescence data from experimental samples can be overlaid on the calibration curve to determine the concentration of simulant in each experimental sample. For all types of analysis, the calibration curve should be substantially linear, and the uncorrected experimental data should fall within. the range of fluorescence values charted on the calibration curve (no extrapolation is permitted). If the calibration curve is substantially nonlinear, a different simulant or dye may need to be selected to provide linear fluorescence behavior in the concentration range of interest. If the uncorrected experimental data fall outside the range of fluorescence values plotted on the calibration curve, a different calibration curve should be generated to include the experimental data range.

A new calibration curve should be generated for each different simulant, for each different batch or lot of the same simulant, and whenever the volume of water used in the test is modified. Experimental data from a given experimental set-up, including specific simulant, water volume, etc., should be analyzed only on the calibration curve for that set-up. Experimental data from a given lot or batch of a simulant should be analyzed only on the calibration curve from that lot or batch. At a minimum, the instrument should be calibrated at least once per month. Ideally, the calibration should be done on a daily basis. To ensure the accuracy of the testing, samples can be taken using disposable cuvets, typically made of methyl acrylate, and pipets.

In another embodiment of the invention, 0.2–0.25 micron latex beads, available from Bangs Laboratories, Inc., of Fishers, Ind., can be used to simulate the smallest size bacteria, as a worst case scenario of fecal leakage. Latex beads contain a negative charge and are uniform in size; therefore they closely represent the physical characteristics of bacteria. A flow cytometer can be used to sort and count the number of beads present in the water when carrying out the method of the invention. Alternatively, the beads are available in a fluorescent form. When using fluorescent beads, a microfluorometer can be used to count the number of beads present in the water. One drawback to using latex beads is the cost, which exceeds the cost of using a fluorescent dye.

To test the dispersion of actual BM versus the dispersion of BM simulant, the following method may be used. Take approximately 1 gram of each of the BM and the BM simulant samples, weigh each, and place each in a drying oven at about 105° C. and dry to constant weight (approximately 2 hours). Remove the material from the oven and cool to room temperature. Re-weigh the samples and calculate the moisture content and percent solids for the samples. Note: original weight (approximately 1 gram) minus final weight equals moisture content (express as percent moisture based on the original weight). Final weight is the dry weight basis (express as percent solids by taking the ratio of final weight/original weight * 100).

Next, to determine percent dispersion loss, take approximately 1 gram of either the actual BM or BM simulant sample, weigh the sample, and add to 50 ml of water in a pre-weighed flask. Place the mixture on a shaker table for a specified time, roughly 10 or 20 minutes, at a pre-specified shaker speed. After the designated time, remove the flask and immediately pour off the liquid through a screen of a mesh that captures the larger particles, but allows the dispersed fine particles to pass. The screen mesh can be selected based on the type of dispersion (fine particles, coarse particles, etc.) sought to be measured. Then the screened liquid may be returned to the preweighed flask and placed in the flask with the residue in the drying oven. The dry weight loss due to dispersion can be recorded based on the information determined above. That is, the remaining dry weight in the flask would indicate a certain percent dispersion loss (on a dry basis) based on the percent solids determined above. The test can be repeated with the other material, namely the actual BM or the BM simulant, and the results from the two materials can be compared.

Once a satisfactory BM simulant is chosen and tested, the configuration of the mannequin should be determined. A motion study can be conducted to identify and document standard water play motions performed by children in a certain weight range. The motions identified in the study can later be computer-analyzed to determine the degree of rotation and/or linear movement per second of the motions. For example, standard positions such as standing and squatting can be analyzed to determine average crotch width. One type of computer software that can be used to analyze the motion study underwater video for BM containment is called MAP, Motion Analysis Package, produced by Concurrent Processing in Detroit, Mich.

In carrying out the motion study, children in a certain weight range are chosen. For example, a weight range of 16–42 pounds can be used, or smaller ranges such as 16–26 pounds, 24–34 pounds, and 32–42 pounds can be used. Three-inch reference marks can be applied to the sides and fronts of the legs of the children, using a permanent marker. Each child wears a specially-marked swim pant, such as HUGGIES® LITTLE SWIMMERS®, pre-marked with a one-inch quadrant pattern on the side panels. The markings on the swim pant and the legs of the children serve as constant dimensions. These reference marks can be used as a calibration tool in the analysis of the motions. While the children engage in normal water play, a cameraman using an underwater video camera can film the children's motions. The videotape can be analyzed to determine the typical motions performed by the children. These motions can then be computer analyzed to determine the degree of rotation and speed of the motions.

Walking/running, swimming/kicking, jumping, stepping up, and squatting are identified as the key motions performed by children during water play. Video footage of these motions can be analyzed to determine the degree of rotation per second of the hip-to-leg motions. Examples of typical data gathered from such a motion study is shown in Table 1 below. When applying the motions to the bench test, an attempt should be made to represent at least 80% of the maximum leg motions of the test participants. As shown in Table 1, due to mobility restrictions of the test mannequin, some motions may fall short of this goal. In addition, in the same study from which the data in Table 1 was gathered, it was found that the average standing crotch width of the children was 19 millimeters (mm).

TABLE 1

Motion Study Data

| | Maximum Leg Motion (toward body) | | Maximum Leg Motion (away from body) | | Average Elapsed |
|---|---|---|---|---|---|
| Activity | Angle Attempted | Angle Achieved | Angle Attempted | Angle Achieved | Time Per Rotation |
| Walking | 125° | 125° | 175° | 170° | 1.5 sec. |
| Swimming | 90° | 90° | 180° | 150° | 1 sec. |
| Jumping | 60° | 84° | 160° | 136° | 1 sec. |
| Stepping Up | 85° | 90° | 168° | 150° | 1.2 sec. |

Similar to the motion study, a qualitative or semiquantitative analysis can be carried out to study the BM containment performance of one or more types or brands of garments. This analysis can be used to document the BM leakage that occurs while the children perform routine motions common to children's water play. The analysis can include the duration of time that it took to leak, the activity that was being carried out when the product leaked, and the quantity of leakage, such as large or small. In carrying out the qualitative or semiquantitative analysis, the following steps are suitable: have the children warm up in the water for 2 to 3 minutes; load each child's pants with 30 cc of BM simulant; have the children walk, or kick if they are unable to walk, continuously for about 1 minute; have the children climb up a pool ladder 3 times; while each child's mother holds the child's hand, have the children jump up and down 10 times; again, have the children walk, or kick, continuously for about 1 minute; and have the children sit down on the top rung of the ladder for about 30 to 60 seconds. Ideally, these steps should be videotaped underwater to document the leakage and mode of failure of the products.

Figure 2:
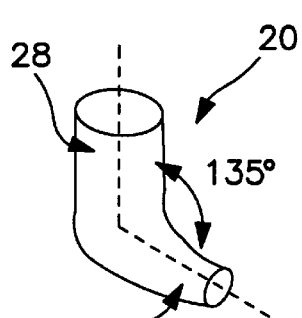
FIG. 2 is a side view of a mannequin in a neutral position.
Figure 3:
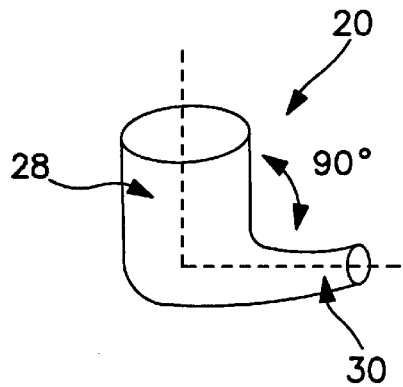
FIG. 3 is a side view of a mannequin in a sitting or squatting position.
Figure 4:
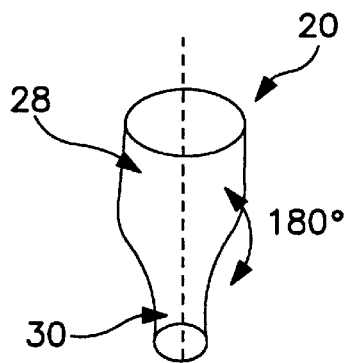
FIG. 4 is a side view of a mannequin in a walking, swimming, kicking, or neutral position.

One particular motion that may create waist leakage among children at play in water is the crouching or jumping motion. This motion may create waist fit issues at a back waist area due to gapping and loose fit. This is a potential area for BM to flow up and out of the product. For this reason, it is important to simulate this motion in a bench test. In order for the mannequin 20 to be able to have the range of motion necessary to create this movement, the neutral position should be a 135° angle between the torso 28 and the legs 30, as shown in FIG. 2. A 45° rotation upwards would create a sitting or squatting position, as shown in FIG. 3, and a 45° rotation downward would create a full upright position that could simulate walking and swimming/kicking, as shown in FIG. 4. These approximate the two positions a child moves between as they crouch and jump.

Using the average measurements described below, two different mannequin torsos can be cast, namely an upright, standing torso and a torso with a 135° torso-thigh angle. The upright, standing mannequin can be utilized for walking. The 135° angle mannequin can be used for swimming, jumping, stepping up, and squatting motions to allow for the high degree of stretch required. Performing these motions with an upright torso may create mobility and durability issues.

The mannequin can replicate as little as the mid-torso to mid-thigh portion of a child's body, thereby replicating the motion of the body parts that affect the containment of a swimwear garment without the need to replicate an entire body. An appropriate mannequin could have size dimensions of the average age and weight of a typical non-toilet-trained actively swimming child, such as a child of approximately 2½ years of age and around 25–30 pounds.

Anthropometric measurements can be taken from a group, preferably a large group, of children. Children can be grouped into size ranges by weight, such as 16–26 pounds, 24–34 pounds, and 32 pounds and over, for example. Data can be collected to determine minimum, maximum and average ages, as well as anthropometric data such as minimum, maximum and average sitting waist, standing waist, hip, pant line, and crotch depth in each size range. The data collected can be used to produce a mannequin having representative dimensions.

Each of the children in the group should be weighed, suitably to the nearest ¼ pound, to determine which size range the child falls into. Each child's standing waist measurement can be determined by measuring the child around the waist at the navel while the child is standing straight in a normal stance with weight evenly distributed and arms relaxed at the sides, as indicated by arrow 32 in FIG. 5. When measuring the child's standing waist measurement, the tape measure should be at the same level in the back as in the front, and the child should be breathing normally and not sucking in the belly. A measurement to the nearest ¼ inch is suitable. Each child's sitting waist measurement can be determined by measuring the child around the waist at the navel with the tape measure at the same level in the back as in the front while the child is sitting on a surface with its hands at its sides and legs either in front or dangling over an edge. Again, the child should be breathing normally, and a measurement to the nearest ¼ inch is suitable. Each child's hip measurement can be determined by measuring the hips at the point where the buttocks are largest when viewed from the side, as indicated by arrow 34 in FIG. 5, as the child is standing straight in a normal stance with their weight evenly distributed. Again, a measurement to the nearest ¼ inch is suitable.

For each of the following measurements, the child should stand normally, as shown in FIG. 6, with hands at the sides and the measuring tape snug but not tight while measuring. The child may be unclothed or wearing cloth underwear. Again, a measurement to the nearest ¼ inch is suitable. For measuring the thigh, the largest part of the thigh should be measured with the measuring tape parallel to the floor, as indicated by arrow 36. For measuring the pant line, the measuring tape should be kept at the angle of the pant line as the length around the pant line, along the gluteal fold, is measured, as indicated by arrow 38. For measuring the crotch depth, a measurement is taken from the navel, through the crotch (over genitals, not around), to the middle of the back at waist level, as indicated by arrow 40 in FIG. 5.

For example, to develop a mannequin for size "medium" testing, the following measurements of a 24–34 pound child may be suitable: sitting waist—513 mm, standing waist—486 mm, hip—514 mm, pant line—323 mm, crotch depth—373 mm.

An industrial design firm, such as Joel Wittkamp Design, Inc. of Morrisville, N.C., can produce the mannequin according to the specifications derived from the anthropometric data. A skeletal system can be designed to provide maximum flexibility and durability, while at the same time being characteristic of human skeletal features. The design of the structure and selection of the materials are critical to obtaining the proper performance needed to simulate human biological characteristics, such as bone structure, muscle tone, and skin surface tension.

The skeletal structure of the mannequin can be made using formed polyurethane components. Hip joints can be simulated using eyebolts. Waterproof polymers can be used to simulate muscle and skin tissue and provide the flexibility and durability required for carrying out the method of the invention. One suitable polymer is a soft, stretchable polyurethane material available from BJB Enterprises, Inc. of Tustin, Calif., under the trade designation Skinflex III. Skinflex III is a castable, stretchy, high strength system that allows the user to select from a great range of hardness and elongation characteristics.

The mannequin 20 is suitably attached to a motion mechanism 48 at the torso region 28 and/or at the thigh or leg region 30 of the mannequin 20, as shown in FIG. 1. The motion mechanism 48 controls the movement of the mannequin 20. The motion mechanism 48 can be detached from the mannequin 20 in order to change the mannequin due to wear and tear, transport, or necessity to try a mannequin of a different size, mobility, or with different torso-leg, angles. To attach the torso region 28 of the mannequin 20 to the motion mechanism 48, a ¾ inch stainless steel 16 UNF threaded rod 60 that is inserted into the mannequin 20 and protrudes roughly 3 inches above the torso region 28 can be connected to the motion mechanism 48, or to a horizontal mounting bracket 64 attached to the tank 22.

The thigh or leg region 30 of the mannequin 20 is suitably attached to the bottom of the tank 22 or to the motion mechanism 48, but can be detached and rotated in order to put the swim pant 50 on relatively easily. To attach the thigh region 30 of the mannequin 20 to the tank 22 in order to simulate a jumping, motion, a ½ inch stainless steel 20 UNF threaded rod 62 that is inserted into the mannequin 20 and protrudes roughly 2.5 inches beyond the thigh region 30 can be connected to the tank 22.

Once the mannequin 20 is anchored to the motion mechanism 48 and possibly to the tank 22, the torso portion 28 and/or thigh region 30 can be driven to create the movements described above. The motion mechanism 48, shown in FIG. 7, includes stainless steel mechanical components within the water tank, along with a variable speed motor 58 attached to the exterior of the tank, that can simulate the swim motions. Alternatively, an air cylinder can be used to simulate the swim motions.

Figure 7:
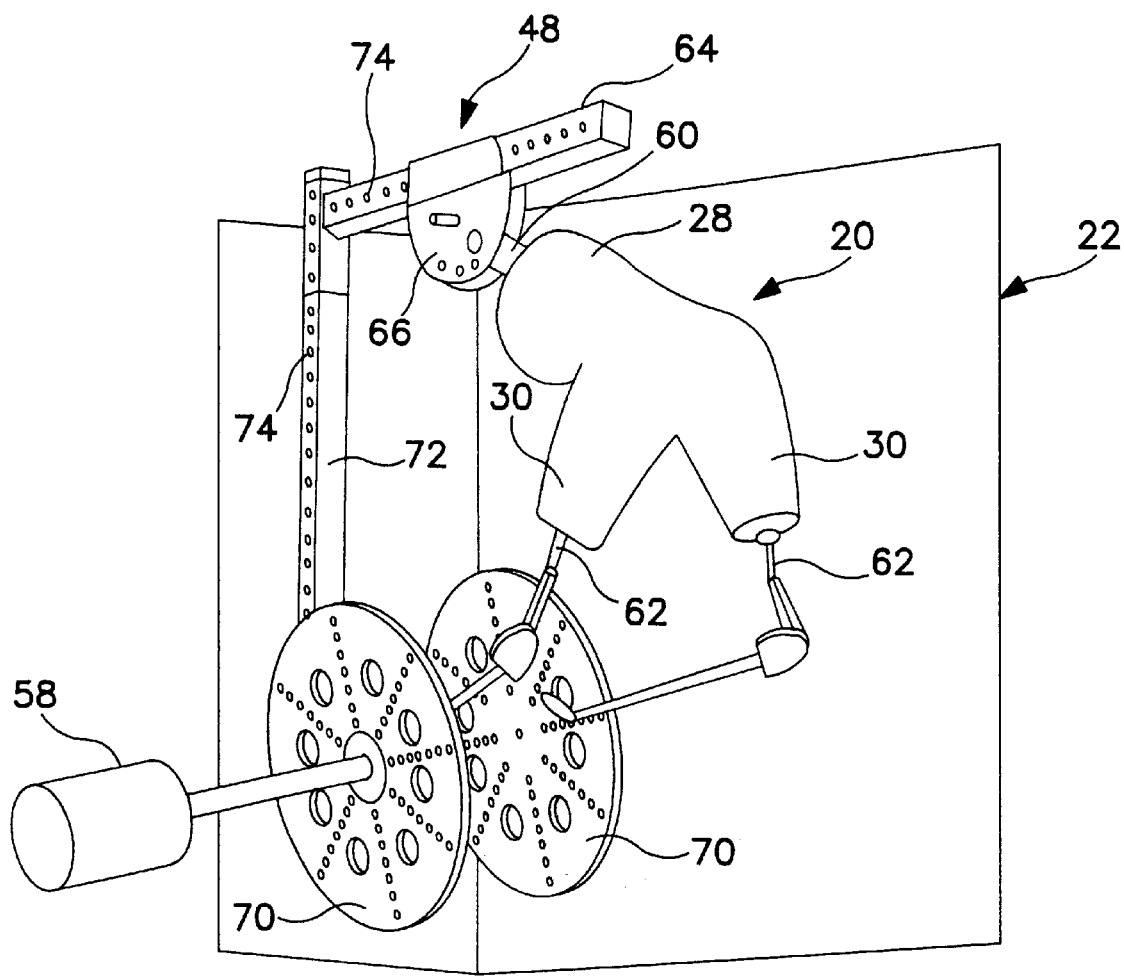
FIG. 7 is a perspective view of a mannequin poised for simulated swimming.
Figure 8:
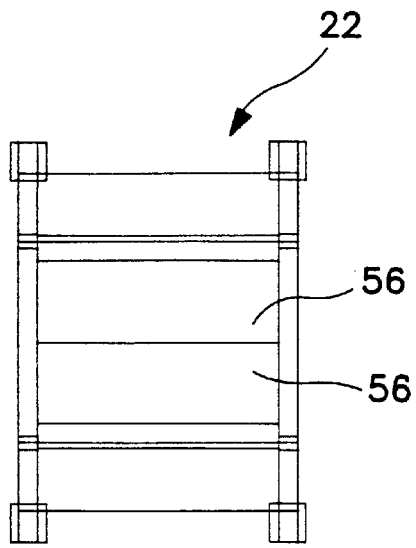
FIG. 8 is a top view of a water tank.
Figure 9:
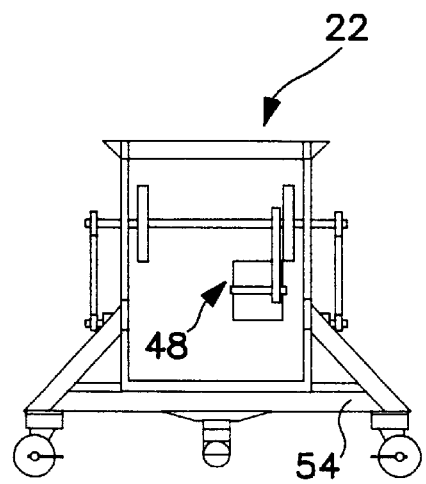
FIG. 9 is a side view of the water tank of FIG. 8.
Figure 10:
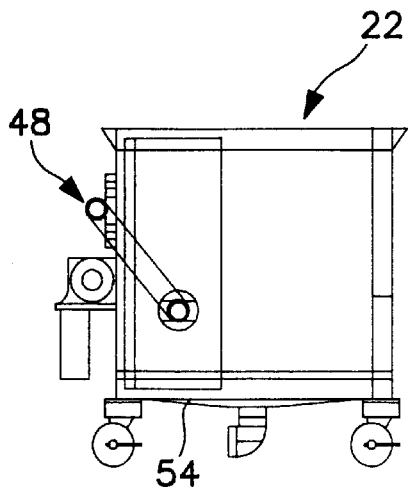
FIG. 10 is a front view of the water tank of FIGS. 8 and 9.
Figure 11:
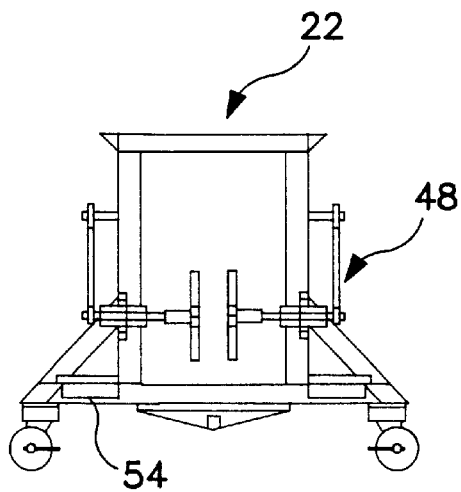
FIG. 11 is a side view of the water tank of FIGS. 8–10, opposite the side shown in FIG. 9.

Referring to FIG. 7, the motion mechanism 48 can include components such as a horizontal mounting bracket 64 attached to the tank 22, an adjustable hanger bracket 66 or pivot assembly 68 attached to the horizontal mounting bracket 64, and/or drive wheels 70 mounted in/on the side walls of the tank and driven by motor 58. Motion mechanism 48 can also include hardware used to connect parts of the motion mechanism 48 to other parts of the mechanism 48, and to connect the mannequin 20 to various points of the motion mechanism 48 in order to simulate the swim motions.

In particular embodiments, the drive wheels 70 can be reamed or drilled at various points to provide attachment points for connecting bars and other hardware. The wheels 70 can be mounted to drive shafts for the motor 58. Each wheel 70 can be mounted from one side only to permit connecting bars to rotate freely across the face of the wheel when connected on the other side of the wheel. Drive shafts for the wheels can be adjustable in length to permit wheels to be spaced closely or farther apart, as may be needed for various motions or for use with different sized mannequins. Wheels can be spaced apart the distance corresponding to the space between thigh posts of the mannequin, or a different distance as required. Attachment of pivot assembly 68 and/or thigh portion 30 of the mannequin 20 to drive wheels 70, either directly or via connecting rods, can be used to drive the mannequin 20 to simulate various swim motions.

Each wheel 70 can have holes provided at various increments from the center of the wheel to facilitate attachment of connecting rods for linkage to mannequin 20 or other hardware. The range of increments can provide a sensitive adjustment for the scale of motions simulated by the motion mechanism and mannequin. A connecting rod can be attached to the wheel in any manner so as to provide free rotation of the connecting rod end around a fixed attachment point on the wheel as the wheel rotates.

The horizontal mounting, bracket 64 can be attached to attachment points 74 along vertical mounting brackets 72 of the tank 22 in a horizontal orientation at an elevation permitting, the mannequin 20 to be suspended above the floor of the tank. The horizontal mounting bracket 64 can provide attachment points 74 along the bracket, at which points the torso 28 of the mannequin 20 or other hardware may be attached.

Figure 12:
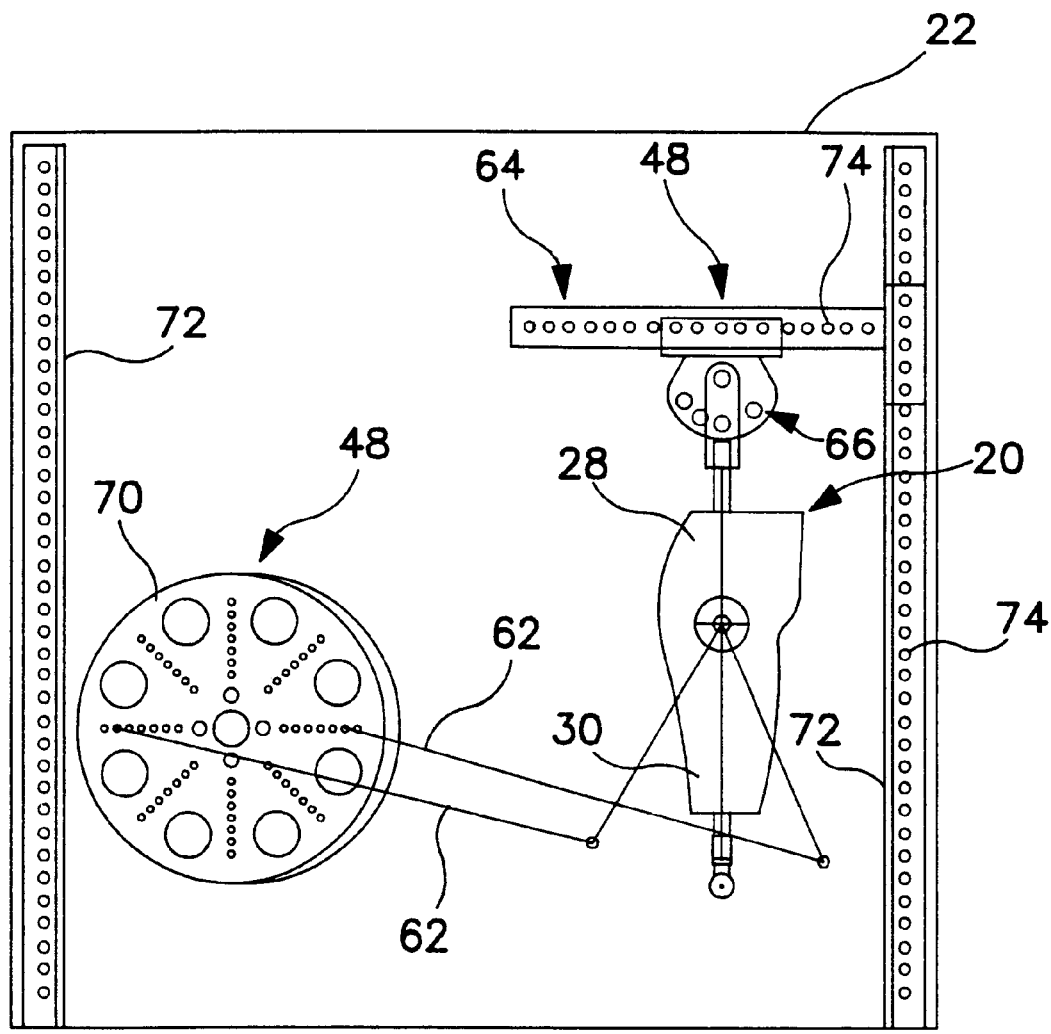
FIG. 12 is a side view of a water tank with a mannequin therein poised for simulated walking.
Figure 13:
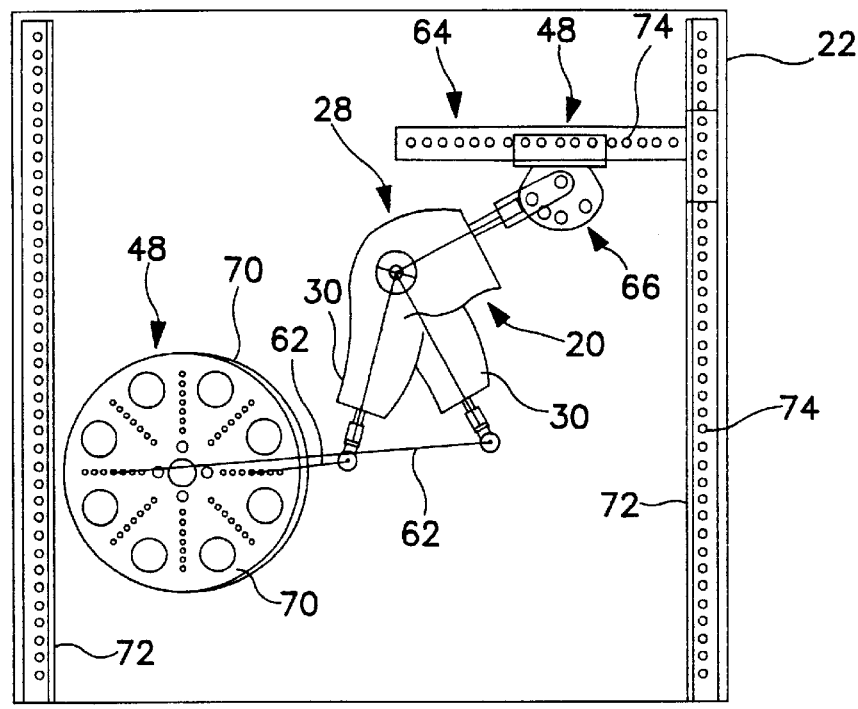
FIG. 13 is a side view of a water tank with a mannequin therein poised for simulated swimming and stepping up.

The adjustable hanger bracket 66 can be mounted on the horizontal mounting bracket 64 and can provide an attachment point for the torso 28 of the mannequin 20. The bracket can provide mounting positions for the torso that enable the torso to be rigidly fixed to the bracket at a variety of angles, such as vertical or inclined angles, as shown in FIGS. 12 and 13, respectively. Alternatively, the bracket can provide a mounting, position from which the torso can swing, or pivot if desired. FIG. 12 shows the mannequin 20 mounted, without the leg region 30 attached to the motion mechanism 48 yet.

Figure 14:
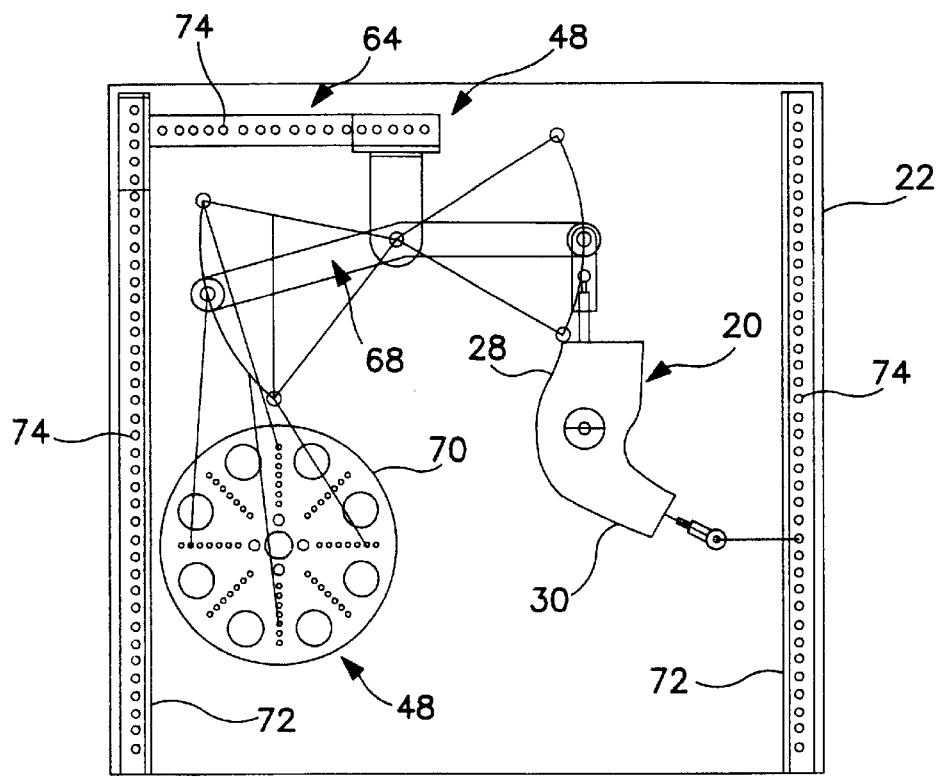
FIG. 14 is a side view of a water tank with a mannequin therein poised for simulated jumping.

The pivot assembly 68 can comprise attachment points at center and end portions, and be attached to the horizontal mounting bracket 64 at its center point, as shown in FIG. 14. Attachment points of the pivot assembly can be designed to allow the connected hardware to pivot freely in the plane of the assembly during motion of the pivot assembly. The beam can be angled to an extent dictated by the scale of other hardware in the system, in order to maintain the mannequin submerged but above the base of the tank during all motions of the beam. The pivot assembly 68 can further be attached at one end to the torso 28 of the mannequin 20, or other hardware, and be attached at the other end to drive wheels 70, as illustrated in FIG. 14.

The various swim motions can be simulated using specific connections between drive wheels 70 and the mannequin or other hardware in the system, as well as specific rates of rotation of drive wheels 70, as is described in detail herein. The lengths and positioning of connecting rods and relative positions of mannequin, pivot assembly, horizontal mounting bracket, hanging bracket, and drive wheels can be selected to provide the desired positions and ranges of motions during rotations of the drive wheels. These selections may be adapted as required for different swim motions, different sized mannequins, or any other necessary adjustments. The mechanisms used to join rods to hardware and to mannequin 20, and to join mannequin 20 to hardware, should be selected to provide the required mobility at each respective joint.

The water tank 22 used to carry out the invention should be large enough to hold enough water to cover the mannequin 20 as the mannequin performs the key motions identified in the motion study, namely walking, swimming, jumping and squatting. A suitable size for the water tank 22 is approximately 3 feet by 4 feet by 4.5 feet. The tank 22 can have vertical mounting brackets 72 centered on the walls in front and behind the mannequin, onto which the mannequin 20 and/or parts of the motion mechanism 48 can be mounted. In the event that side to side motion is desired, the mannequin 20 can either be rotated 90 degrees, or the motion mechanism 48 can be set up to be able to do both straight plunging and/or side to side motion.

An up and down plunging motion can provide a jumping motion. The mechanical plunging motion can be achieved by attaching the upper torso of the 135° mannequin to an end of a pivot assembly attached to the top assembly bracket of the water tank by a center, or pivot, point. The opposite end of the pivot assembly can be attached to a drive wheel. When the pivot assembly has partially or fully raised the mannequin, the legs of the mannequin can be attached to the side wall with connecting bars to provide a designed bend in the mannequin's leg on the down stroke of the motion. More specifically, the deep water jumping motion is performed using the water tank set-up described below, as illustrated in FIG. 14.

The water tank 22, shown in detail in FIGS. 8–11, can be clear on all sides, including the bottom, for easy viewing. Furthermore, the water tank 22 can be supported on a stand 54 that holds the tank around chest height for easy viewing.

The tank 22 may be portable and can have a splashguard 56 on top that opens like a door for easy access. Backlighting in the tank 22 can allow for the detection of small particles leaving the garment being tested. The water tank 22 can hold approximately 175 gallons of water, or can be tailored to any other suitable size.

The water tank 22 with the mannequin 20 poised for simulated walking is shown in FIG. 12. The water tank 22 with the mannequin 20 poised for simulated swimming and stepping up is shown in FIG. 13. As mentioned, the water tank 22 with the mannequin 20 poised for simulated jumping is shown in FIG. 14.

To set up the apparatus for the jumping motion, for example, connect one end of a connecting rod 62 to the drive wheel 70 by placing a pin through a ball joint end of the rod into a hole in the drive wheel, as shown in FIG. 7. Attach the opposite end of the connecting rod 62 to the pivot assembly 68 (FIG. 14), attach the horizontal mounting bracket 64 to the vertical mounting bracket 72 on the same side of the tank 22 as the drive wheels 70, at the top of the tank. Attach the center point of the pivot assembly to the horizontal bracket at the top of the water tank. Attach the mannequin to the free end of the pivot in the manner shown in FIG. 14.

A variable speed plunging motion can be carried out, with an approximately 6 inch plunging motion, with the option of continuous or discontinuous motion. The frequency of the plunging depends largely on the motion being carried out, but can typically be in a range of about 0.5 to about 1.1 rotations of the drive wheel per second. Suitably, the frequency of the drive wheel is slowest during the walking motion and fastest during the jumping motion.

Using an electric digital flowmeter, approximately 175 gallons of water can be added to the water tank. Tap water is sufficient. An example of a suitable flowmeter is Model A104GMN100NA1*0, available from Great Plains Industries, Inc., of Wichita, Kans. The water tank can be equipped with two pumps, one to put water in and the other to take water out, thereby avoiding contamination. Furthermore, the tank is then easy to drain and easy to refill. To uniformly disperse the fluorescent dye in the water, a submersible water pump can be added to the bottom of the tank. An example of a suitable submersible pump is Master Plumber Model#607 504, 57700-MPL, available from Master Plumber in Harrison, Ohio. An exit port of the submersible water pump can be positioned so that the water in the tank rolls from the bottom to the top of the tank. A thermometer can be positioned inside the tank for monitoring water temperature.

Once the apparatus is set up, a series of motion sequences and rest sequences suitable to simulate real water play motions can be carried out. The actual test method for carrying out the BM containment bench test of the invention for a jumping, motion can include the following steps:

1. Prior to setting up the bench test, remove three vials of fluorescent BM simulant from a refrigerator. The BM simulant will then be at room temperature for the bench testing.
2. Fill a water tank with about 175 gallons of approximately 80° F. water, and turn on a submersible water pump to allow water to agitate. The water can be supplied and/or maintained at about 78–82° F. by any suitable method known in the art. This temperature range is consistent with the water temperatures of many public pools. Alternatively, the water temperature can be maintained at any desired temperature.
3. Apply a first test product (swimwear) on the mannequin prior to attaching the mannequin to the water tank's motion mechanism. The product should be pulled up tight in the crotch. If flaps or other containment features are present on the product, they should be properly tucked inside the product. Attach the mannequin to the motion mechanism, as described above. Note: attach the mannequin to the motion mechanism after the water tank is full; water provides buoyancy, which helps to displace the weight of the mannequin.
4. Ensure the proper alignment of the submersible water pump. To obtain optimum water agitation, the output port should be facing the opposite sidewall. It is important that the submersible pump run continuously throughout testing. The pump is programmable and keeps a constant pressure and flow rate for circulation of the sample through the measurement cell.
5. Using a digital timer, allow the mannequin to carry out the jumping motion for 60 seconds prior to injecting the fluorescent BM simulant. By stopping the mannequin at its highest position, less bending is required by the researcher when injecting the BM simulant into the pant and removing the mannequin from the motion mechanism Also, less stress is placed on the mannequin at its highest position.
6. Stop the motion by turning the switch of the motor to "Off".
7. Take a 500 ml water sample from water tank (Sample 0) by first placing a sampling flask approximately 4 inches below the water line. Proceed by employing a single sweeping motion spanning across the tank away from the tester's body. Withdraw the flask containing the tank water, affix a cover labeled with the sample name, and set it aside.
8. Pull the back of the pant away from the mannequin. Using a 60 cc catheter tip syringe (available from Becton Dickinson, Model#309664), inject 30 cc of FECLONE® Fluorescein-15-0.05×between the back side of the mannequin and the test product. The syringe tip should be placed flat against the bottom of the pant at a 90° angle to the pant. Slowly depress the syringe plunger until all FECLONE® has been released. After injection, withdraw the syringe and readjust the pant to its original height and position on the mannequin.
9. Allow the mannequin to jump, step up, swim or walk for a sufficient amount of time to generate measurable leakage from the garment being tested, for example, around 20 seconds (12 jumps) for jumping or around 3 minutes for swimming. During this time, qualitative data can be recorded.
10. Allow the mannequin to rest for about 2 minutes. During the rest period, break down undispersed BM simulant particles utilizing a skimmer net. Avoid disturbing the mannequin by maneuvering the skimmer net clear of the apparatus.
11. Repeat Steps 9–10 two more times.
12. After the last jumping motion and two minute rest, remove the mannequin from the water tank by detaching the mannequin from the motion mechanism and lifting by the attachment bracket only. Hold the mannequin above the water for about 5 seconds to allow water to run out of the test product and back into the tank.
13. Take a 500 ml water sample from the water tank (Sample 1), using the procedure outlined in Step 7 above, and set it aside.
14. Set a timer for 5 minutes. Allow 5 minutes for Steps 14 & 15. Remove the soiled test product and clean the mannequin with a wipe, such as a baby wipe, until no remaining simulant is visible on the mannequin.

15. Apply test product#2 (same as test product#1 or different type of swimwear) to the mannequin.
16. Repeat Steps 5–15.
17. Take a 500 ml water sample from the water tank (Sample 2) and set it aside.
18. Set the timer for 5 minutes. Allow 5 minutes for Steps 17 & 18. Detach the mannequin from the motion components and lift the mannequin above the water. Hold the mannequin out of the water for about 5 seconds to allow the water to run out of the test product. After removing the mannequin from the water tank, remove the soiled swim pant and clean the mannequin with a wipe.
19. Apply test product#3 to the mannequin.
20. Repeat Steps 5–15.
21. Take a 500 ml water sample from the water tank (Sample 3) and set it aside.
22. Remove the mannequin from the water tank, remove the soiled test product and clean the mannequin with a wipe.

Further test products can be tested following the same procedure. After the samples have been taken, the water tank can be emptied and cleaned thoroughly with warm water. To empty the water tank, first unplug the motor and the submersible pump. Remove the drain plug from bottom of the tank and then open the exterior drain valve. To ensure the reliability of future test data, all residual fluorescent dye must be cleaned from the tank, the submersible pump, the skimmer net, and all supplies used during testing.

Prior to carrying out the bench test method of the invention, the fluorescence meter should be calibrated. The fluorescence meter should be calibrated prior to the use of a new BM simulant, as well. The calibration curve for a given simulant should be used to analyze only the experimental samples employing that simulant. In addition, calibration samples should be prepared from the same single batch or lot of fluorescent BM simulant that is used for product testing. The method for calibrating the fluorescence meter is similar to the method of carrying out the bench test. More specifically, the steps used to carry out the calibration include:

1. Prior to performing the calibration, remove three vials of fluorescent BM simulant from the refrigerator. The BM simulant will then be at room temperature for the calibration.
2. Follow Step 2 from the bench test procedure above.
3. Ensure the proper alignment of the submersible water pump. To obtain optimum water agitation, the output port should be facing the opposite sidewall. It is important that the submersible pump run continuously throughout testing.
4. Prepare 10 sample containers. Covers for the containers should be marked "0", "10", "20", "30", "40", "50", "60", "70", "80", and "90".
5. Prior to testing, take calibration sample "0". Affix an appropriately labeled cover and set aside.
6. Using a pool net and a catheter-tip syringe, add 10 cc of fluorescent BM simulant to a lower portion of the net.
7. For about 5 minutes, disperse the fluorescent BM simulant into the water using the pool net and a rubber scraper.
8. Take a calibration sample by first placing a sampling flask approximately 4 inches below the water line. Proceed by employing a single sweeping motion spanning across the tank away from the tester's body. Withdraw the flask containing the tank water, affix the appropriately labeled cover and set aside.
9. Repeat Steps 6–8 until 90 cc of the BM simulant have been added to the water tank.
10. After calibration samples have been taken, the water tank can be emptied and cleaned thoroughly with warm water. To empty the water tank, first unplug the motor and the submersible pump. Remove the drain plug from the bottom of the tank and then open the exterior drain valve. To ensure the reliability of future test data, all residual fluorescent dye must be cleaned from the tank, the submersible pump, the skimmer net, and all supplies used during testing.
11. Test calibration samples using the fluorescence spectrophotometer.
12. Turn on the computer, computer monitor, and the fluorescence spectrophotometer.
13. Load FL Solutions software. Press "File" and "Open". Press the drop-down button for the "Files of type" option. Select "All Files". Select the "calibration" file.
14. The calibration method last used will automatically load. Use the same spectrophotometer settings listed below in Step 2 of the experimental sample testing, procedure.
15. Click on the "instrument" tab. Verify the EX and EM slits are both set to 5.0 nm.
16. Click on the "Quantitation" tab. Deselect "Manual Calibration". Press OK.
17. Press "X" to exit calibration setup.
18. In the FL Solutions software, press "Measure".
19. Slowly turn the sample container 10 times by placing the vial partly or fully on its side and rolling it slowly to equally disperse the fluorescent dye. Do not shake the sample container. If shaken, air bubbles may form, which may cause unreliable readings.
20. Using disposable cuvets and pipets, prepare two samples for each of the ten calibration samples taken using the following techniques. Being careful to avoid bubbles, pipet an amount sufficient to fill the cuvet into the cuvet chamber. Samples should be placed in cuvets immediately before analysis to avoid settling of particles.
21. Press "Yes" to "Continue analysis with this standard".
22. Carefully insert a sample cuvet into the fluorescence meter's single cell holder, being careful not to touch the bottom half of the cuvet If necessary, wipe the cuvet to remove water, fingerprints, etc. prior to testing.
23. In the FL Solutions software, press "Yes" to begin testing first replicate.
24. Allow the sample to scan. When the instrument is ready for the next sample, the monitor will display "Ready".
25. As directed, remove the first replicate sample and replace with the second replicate sample. Press "Yes".
26. Repeat Steps 19–25 until all samples are tested.
27. After retesting is complete, press "OK" to "Go to measure samples". At least 4 samples can be re-tested to verify calibration accuracy. Suitably, the concentration levels of samples 10, 30, 50, 70 and 90 could be tested.

28. After testing is completed, Press "End".
29. Save data to disk.
30. Press "X" to exit report.
31. Press "Method" button.
32. Press "Quantitation" tab. Select "Manual Calibration".
33. Press "OK".
34. The fluorescence instrument is now calibrated for testing with the current fluorescent BM simulant. All calibration settings will automatically be saved when you exit the software. The fluorescence instrument must be recalibrated each time a new batch of fluorescent BM simulant is procured.

Test the experimental samples using the fluorescence spectrophotometer and the following test procedure:

1. Turn on computer, computer monitor, and the fluorescence spectrophotometer.
2. Load FL Solutions software. The test method last used in FL Solutions will automatically load. Depending upon the fluorescent BM simulant used, the following emission and excitation values may be appropriate:
   FECLONE™15-MG: Excitation 225, Emission 350
   FECLONE™ Fluorescein-15-0.1x: Excitation 469, Emission 512
   To measure the FECLONE™, the spectrophotometer is set to Photometer mode with slits at 5 nm/5 nm, PMT voltage at 700 V, and response at approximately 10 seconds. Measurements of samples and standards are made in a static mode using polymethacrylate fluorescence cells (1 cm×1 cm inner diameter).
3. Slowly turn the collection vial 10 times by placing the vial partly or fully on its side and rolling it slowly to equally disperse the fluorescent dye. Do not shake the sample container. If shaken, air bubbles may form, which may cause unreliable readings.
4. Utilizing disposable cuvets and pipets, prepare two samples for each collection vial using the following techniques. Being careful to avoid bubbles, pipet an amount sufficient to fill the cuvet into the cuvet chamber. Samples should be placed in cuvets immediately before analysis to avoid settling of particles.
5. In the FL Solutions software, press "Measure".
6. Carefully insert a sample cuvet into the fluorescence spectrophotometer's single cell holder, being careful not to touch the bottom half of the cuvet. If necessary, wipe the cuvet to remove water, fingerprints, etc. prior to testing.
7. In the FL Solutions software, press "Sample".
8. Repeat Steps 6–7 until all samples are tested.
9. After testing is complete, press "End" to save data.
10. Record data on record sheet.
11. Save data to disk.
12. Discard all used cuvets and pipets after use.
13. Close out of FL software as follows:
    Select "Close the lamp, then close the monitor window?" Press "Yes"
14. Thoroughly clean collection vials and allow to air dry.
15. For each experiment, average the two data points obtained for that experimental sample. Correct the experimental data by subtracting the fluorescence value of each sample from the fluorescence value of the next sample. Because the data collected are additive (i.e., the tank is not cleaned between individual samples), each sample becomes a blank sample for the next trial. Fluorescence values of Samples 1 through X must be corrected for the background fluorescence already present when the tests to create these samples were begun. Subtract Sample 0 fluorescence from Sample 1 fluorescence; subtract (uncorrected) Sample 1 fluorescence from Sample 2 fluorescence; and so forth. For quantitative analysis, the data can be analyzed by comparing them to the calibration curve. This would permit one to determine the exact amount of simulant that escaped from a product during a test. Semiquantitative analysis does not require the comparison of experimental data to the calibration curve, except to be certain that the experimental values fall within the linear range of the calibration curve. Of two different products analyzed by identical methods (same simulant, same motion test, etc.), the product with the lower corrected fluorescence value may be regarded as less likely to leak than the product with the higher corrected fluorescence value.

This is an example of a test method used. The number of products tested is limited only by the response of the spectrophotometer and the ability to take qualitative measurements. Other examples of set-ups for use with the test method, namely for swimming or stepping up and for walking, are described below.

The swimming and stepping up motions are quite similar due to the similarity of the angles used to simulate these motions. Both of these motions are obtained by attaching the upper torso 28 of the 135° mannequin 20 to an adjustable hanger bracket 66 attached to the horizontal assembly bracket 64 at the top of the water tank 22. Both legs 30 are connected directly to the two drive wheels 70. In order to provide alternating, or out of phase, thigh movements, one thigh is attached via a connecting rod 62 to a position on one drive wheel 70, while the other thigh is attached via a second connecting rod 62 at an opposed position of the other drive wheel 70, as indicated in FIG. 13. Because most young children swim with their heads above the water, the position of the test mannequin can be angled relative to the horizontal axis. More specifically, the swimming and stepping up motions are performed using the following water tank set-up, as illustrated in FIG. 13.

On the vertical mounting bracket 72 on the opposite side as the drive wheels 70, attach the horizontal mounting bracket 64. Secure the adjustable hanger bracket 66 to the horizontal mounting bracket. Attach the mannequin 20 to the adjustable hanger bracket 66, as shown in FIG. 13.

The walking motion can be achieved by attaching the upper torso 28 of the straight, upright mannequin 20 to an adjustable hanging bracket 66 attached to the horizontal mounting bracket 64 at the top of the water tank 22. In order to provide alternating, or out of phase, thigh movements, one thigh 30 is attached via a connecting rod 62 to a position on one drive wheel 70, while the other thigh 30 is attached via a second connecting rod 62 at an opposed position of the other drive wheel 70, as shown in FIG. 12.

More specifically, the walking motion can be performed using the water tank set-up shown in FIG. 12. On the vertical mounting bracket 72 on the opposite side of the motor assembly, attach the horizontal mounting bracket 64. Secure the adjustable hanger bracket 66 to the horizontal mounting bracket 64. Attach the mannequin 20 to the adjustable hanger bracket 66.

It will be appreciated that details of the foregoing embodiments, given for purposes of illustration, are not to be construed as limiting the scope of this invention.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

We claim:

1. A method of evaluating a worn swimwear for underwater leakage of a bowel movement fluid mixture past the swimwear, comprising the steps of:

applying the swimwear to a mannequin;

inserting bowel movement simulant into the swimwear;

submerging the mannequin in water within a water tank; and measuring leakage of the bowel movement simulant that escapes from the swimwear into the water of the water tank.

2. The method of claim 1, further comprising the step of attaching the mannequin to a mechanical motion generating mechanism including apparatus for simulating one or more water play motions by the mannequin.

3. The method of claim 2, wherein the mechanical motion generating mechanism includes apparatus for simulating a walking motion by the mannequin.

4. The method of claim 2, wherein the mechanical motion generating mechanism includes apparatus for simulating a swimming motion by the mannequin.

5. The method of claim 2, wherein the mechanical motion generating mechanism includes apparatus for simulating a jumping motion by the mannequin.

6. The method of claim 2, wherein the mechanical motion generating mechanism includes apparatus for simulating a stepping up motion by the mannequin.

7. The method of claim 2, wherein the mechanical motion generating mechanism includes apparatus for simulating a squatting motion by the mannequin.

8. The method of claim 1, wherein the bowel movement simulant comprises a fluorescent component.

9. The method of claim 8, further comprising the step of using a fluorescence meter to measure leakage of the fluorescent component of the bowel movement simulant into the water tank from the swimwear.

10. The method of claim 1, wherein the bowel movement simulant comprises a plurality of latex beads.

11. The method of claim 10, further comprising the step of using a flow cytometer to sort and count the number of latex beads present in the leakage of the bowel movement simulant into the water tank from the swimwear.

12. A method of evaluating a worn swimwear for underwater leakage of a bowel movement fluid mixture past the swimwear, comprising the steps of:

applying the swimwear to a mannequin;

inserting a fluorescent bowel movement simulant into the swimwear;

submerging the mannequin in water within a water tank; and using a fluorescence meter to determine an amount of leakage of the fluorescent bowel movement simulant that escapes from the swimwear into the water of the water tank.

13. The method of claim 12, wherein the fluorescence meter comprises a fluorescence spectrophotometer.

14. The method of claim 12, further comprising the step of calibrating the fluorescence meter with the fluorescent bowel movement simulant.

15. The method of claim 12, further comprising the step of using a disposable cuvet to take a water sample from the water tank.

16. The method of claim 12, further comprising the step of using a disposable pipet to take a water sample from the water tank.

17. The method of claim 12, further comprising the step of attaching the mannequin to mechanical generating a motion flexing component that can simulate water play motions by the mannequin.

18. A method of evaluating a worn swimwear for underwater leakage of a bowel movement fluid mixture past the swimwear, comprising the steps of:

applying the swimwear to a mannequin;

submerging the mannequin in water within a water tank;

attaching the mannequin to a mechanical motion generating mechanism;

inserting a bowel movement simulant into the swimwear on the mannequin;

plunging the mannequin up and down in the water tank; and determining an amount of leakage of the bowel movement simulant that escapes from the swimwear into the water of the water tank.

19. The method of claim 18, wherein the bowel movement simulant comprises a fluorescent component.

20. The method of claim 19, further comprising the step of using a fluorescence meter to determine the amount of leakage of the fluorescent component of the bowel movement simulant into the water tank from the swimwear.

21. The method of claim 20, further comprising the step of calibrating the fluorescence meter with the fluorescent bowel movement simulant.

22. The method of claim 18, wherein the mannequin replicates a mid-torso to mid-thigh portion of a child's body.

23. The method of claim 22, wherein the mechanical motion generating mechanism is attached to the mid-torso region of the mannequin.

24. The method of claim 22, wherein the mid-thigh region of the mannequin is attached to the water tank.

25. The method of claim 18, wherein a distance between a first leg on the mannequin and a second leg on the mannequin can be adjusted.

26. The method of claim 18, further comprising the step of continuously agitating the water in the water tank.

27. The method of claim 18, further comprising the step of analyzing the water within the water tank using a continuous-flow cuvet.

* * * * *